US009327419B2

(12) United States Patent
Gallucci

(10) Patent No.: US 9,327,419 B2
(45) Date of Patent: May 3, 2016

(54) APPARATUS FOR CUTTING AND/OR ETCHING ARTICLES COMPRISING A FLAT SURFACE ON WHICH DESIGNS AND/OR WRITINGS ARE REPRODUCED AND A METHOD FOR ACTUATING THE APPARATUS

(76) Inventor: Giuseppe Gallucci, Monte Urano (IT)

( * ) Notice: Subject to any disclaimer, the term of this patent is extended or adjusted under 35 U.S.C. 154(b) by 729 days.

(21) Appl. No.: 13/499,748

(22) PCT Filed: Oct. 11, 2010

(86) PCT No.: PCT/IB2010/054589
§ 371 (c)(1),
(2), (4) Date: Apr. 2, 2012

(87) PCT Pub. No.: WO2011/045729
PCT Pub. Date: Apr. 21, 2011

(65) Prior Publication Data

US 2012/0197427 A1 Aug. 2, 2012

(30) Foreign Application Priority Data

Oct. 12, 2009 (IT) .............................. BO2009A0655

(51) Int. Cl.
*G06F 7/66* (2006.01)
*B26D 5/00* (2006.01)
*B26F 1/38* (2006.01)

(52) U.S. Cl.
CPC ................ *B26D 5/007* (2013.01); *B26D 5/005* (2013.01); *B26F 1/38* (2013.01)

(58) Field of Classification Search
CPC ..... B21D 5/02; G02B 13/001; G02B 26/0833
USPC .......................................................... 700/114
See application file for complete search history.

(56) References Cited

U.S. PATENT DOCUMENTS

| | | | | |
|---|---|---|---|---|
| 4,803,735 | A * | 2/1989 | Nishida et al. | 382/151 |
| 4,901,359 | A * | 2/1990 | Bruder | 382/111 |
| 5,614,115 | A * | 3/1997 | Horton et al. | 219/121.67 |
| 6,619,168 | B2 * | 9/2003 | Alsten et al. | 83/13 |
| 2009/0137195 | A1 * | 5/2009 | Bottemiller et al. | 452/150 |

FOREIGN PATENT DOCUMENTS

| | | | |
|---|---|---|---|
| EP | 17829929 | A | 5/2007 |
| FR | 2659264 | A | 9/1991 |

OTHER PUBLICATIONS

International Search Report for PCT/IB2010/054589, Mailed Mar. 2, 2011, 3 pages.

* cited by examiner

*Primary Examiner* — Mohammad Ali
*Assistant Examiner* — Md Azad
(74) *Attorney, Agent, or Firm* — R. Neil Sudol; Henry D. Coleman

(57) ABSTRACT

An apparatus (1) for cutting and/or etching articles (4) having a flat surface on which designs and/or writings (11A, 11B, 11C) are reproduced has an operating group (5) arranged above a work plane (2), which work plane (2) is provided with an upper surface (3) for receiving the articles. The operating group is movable along the work plane (2) in order to operate on the articles (4) for cutting and/or etching the articles (4). A first optical device detects designs and/or writings (11A, 11B, 11C) reproduced on the articles arranged on the work plane (2). The apparatus (1) has a second optical device (9) arranged with respect to the surface (2) such as to detect the orientation as well as the position of the articles (4) on the work plane (2) as well as the designs and/or the writings (11A, 11B, 11C) reproduced on the articles.

3 Claims, 2 Drawing Sheets

APPARATUS FOR CUTTING AND/OR ETCHING ARTICLES COMPRISING A FLAT SURFACE ON WHICH DESIGNS AND/OR WRITINGS ARE REPRODUCED AND A METHOD FOR ACTUATING THE APPARATUS

TECHNICAL FIELD

The invention relates to the technical sector concerning cutting and/or etching of designs and/or writings reproduced on a flat surface of an article, for example a photograph or a cardboard surface.

In particular, the invention relates to an apparatus for cutting and/or etching articles comprising a flat surface on which designs and/or writings are reproduced, and to a method for actuating the apparatus.

DESCRIPTION OF THE BACKGROUND ART

A known-type apparatus for cutting and/or etching substantially planar articles, comprising a flat surface on which designs and/or writings are made, comprises an operating group bearing cutting and/or etching means, provided for cutting and/or etching predetermined portions of the flat surface of the article, and further bears optical means for detecting the position and orientation of the designs and/or writings reproduced on the articles.

The operating group is arranged above a work plane, on which the article is rested, and is mobile along the work plane.

The work plane comprises abutting elements, arranged on the upper surface; the operator, having placed the article resting on the work plane, positions it abuttingly against the abutting elements.

The optical means are constituted by a vision camera which is connected to a control panel; due to its closeness to the work plane, the vision camera has a rather limited visual field and generally is able to capture only a portion of the flat surface of the article.

Numerous items of data are entered into the control panel, among which: the dimensions of the article to be worked; the number of designs and/or writings present on the article; the arrangement of the designs and/or writings on the flat surface of the article; the position, with respect to a reference system used for moving the operating group, in which the article will be arranged when it is positioned abutting the abutting elements; the portions of the surface of the article to be cut and/or etched and the sequence with which the cutting and/or etching operations will be made on the portions of the surface of the article.

The operating group is piloted by the control panel towards the article; the control panel knows the position of the article, when it has been placed by the operator against the abutting elements, such that the vision camera takes images of portions of the flat surface in which the designs and/or writings are present.

The control panel analyses the images of the vision camera such as to precisely identify the position of each design and/or writing of the article with respect to the reference system used for the movement of the operating group; this means that the position of each design and/or writing is known with the precision necessary for correctly performing the cut and/or etching.

The operating group is then piloted by the control panel to cut and/or etch the portions to be cut and/or etched on the basis of the data read by the vision camera relating to the position and orientation of the designs and/or the writings.

The operator however has to correctly orientate the article when arranging it abutting against the abutting elements such that the control panel correctly interprets the data supplied by the vision camera; a wrong orientation of the article would in fact cause errors in the following cutting and/or etching stage, as a design and/or a writing might be mistaken for another and consequently the cut and/or etching would be erroneously performed.

Therefore the operator has to be trained in how to orientate each article in order to arrange it correctly abutting against the abutting elements, basing his judgment for example on distinctive geometrical elements of the flat surface of the article and/or the arrangement of the designs and/or the writings with respect to the abutting elements.

In the light of the above, there is a high degree of probability that the operator might commit errors of orientation during the stage of positioning the article abutting against the abutting elements, in particular when the change of type of article under production is changed, i.e. when the article to be positioned on the work plane abutting against the abutting elements has geometrical characteristics and/or an arrangement of the designs and/or writings which are different from that or those of the preceding article.

SUMMARY OF INVENTION

The aim of the present invention is to provide a technical solution which obviates the above-described drawbacks, i.e. provides a technical solution which enables cutting and/or etching articles comprising a flat surface on which designs and/or writings are made, enabling the operator to avoid having to orientate the article.

The aim is attained by means of an apparatus for cutting and/or etching articles, and with a method for actuating the apparatus.

The apparatus for cutting and/or etching the articles comprising a flat surface on which designs and/or etchings comprises:

- an operating group arranged above a work plane, which work plane is provided with an upper surface for receiving articles comprising a flat surface on which designs and/or writings are reproduced, the operating group being mobile along the work plane in order to operate on the articles and comprising means for cutting and/or etching the articles and first optical means for detecting designs and/or writings reproduced on the articles when the articles are arranged on the work plane; the apparatus comprising second optical means arranged with respect to the surface such as to detect the whole upper surface of the work plane and to detect the orientation as well as the position of the articles on the work plane.

The second optical means capture an image of the whole upper surface of the work plane and, by processing this image, are able to detect the position and orientation of the articles on the work plane such as to identify the position and orientation of each design and/or writing with respect to the work plane.

The article therefore advantageously can be arranged on the work plane in any position and any orientation; this increases the productivity of the cutting and/or etching apparatus which require no care and attention to positioning/orientation of the article, thus reducing the risk of such errors, as the article does not have to be arranged on the work plane abutting against the abutting elements and with a predetermined orientation.

The method for actuating the apparatus comprises, in order, the following stages:

arranging at least an article restingly on the upper surface of the work plane, such that the flat surface of the article on which the designs and/or the writings are reproduced is facing upwards;

detecting the whole upper surface of the work plane and also an orientation as well as a position of the article on the work plane, by means of the second optical means.

BRIEF DESCRIPTION OF THE DRAWINGS

Specific embodiments of the invention and advantageous technical-functional characteristics correlated to the embodiments that are only in part derivable from the above description will be described in the following description, in accordance with the content of the claims, and with the aid of the accompanying figures of the drawings, in which:

DESCRIPTION OF PREFERRED EMBODIMENTS OF THE INVENTION

Figure 1:
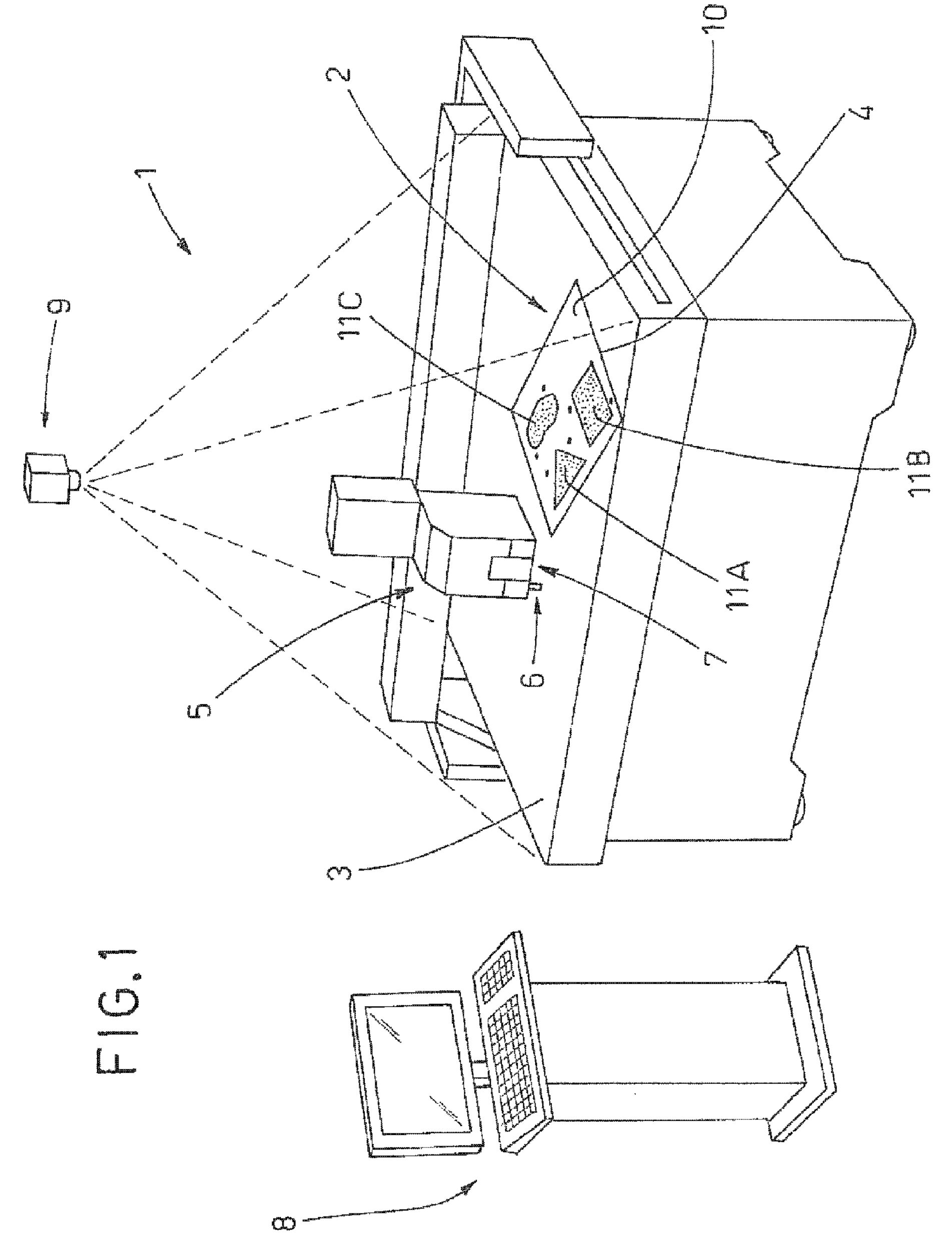
FIG. 1 is a perspective view of the cutting and/or etching apparatus of the present invention.

The apparatus 1 for cutting and/or etching articles 4 comprising a flat surface 10 on which designs and/or writings 11A, 11B, 11C are reproduced, illustrated in FIG. 1, comprises: an operating group 5 arranged above a work plane 2, which work plane 2 is provided with an upper surface 3 for receiving articles 4, the operating group 5 comprising means 6 for cutting and/or etching the articles and first optical means 7 for detecting designs and/or writings (11A, 11B, 11C) reproduced on the articles when the articles 4 are arranged on the work plane 2; second optical means 9 arranged with respect to the work plane 2 in order to detect the whole upper surface 3 of the work plane 2 and to detect both the orientation and the position of the articles on the work plane 2.

The operating group 5 is borne by a portal structure the elements of which are mobile such that the operating group 5 is able to operate on all the upper surface 3 of the work plane 2.

The operating group 5 is arranged at a first height with respect to the upper surface 3 of the work plane 2 and is mobile along a parallel plane to the plane identified by the upper surface 3 of the work plane 2, while the cutting and/or etching means 6 are mobile along a vertical direction in order to act on the article 4 and make the cut and/or etching on the flat surface 10 of the article 4.

The first optical means 7 comprise a first vision camera 7, housed internally of the operating group 5.

The first vision camera 7 is preferably arranged with the optical axis perpendicular to the work plane 2; this arrangement enables performing measurements on the acquired image using faster and more precise algorithms.

The second optical means 9 are constituted by a second vision camera 9, fixed to the frame of the apparatus, arranged above the upper surface 3 of the work plane 2 at a second height which is greater than the first height of the operating group 5 and destined to capture the whole upper surface 3 of the work plane 2.

The second vision camera 9 is arranged such that the relative optical axis is perpendicular to the upper surface 3 of the work plane 2; this advantageously enables processing the acquired images using faster and more precise algorithms.

The functioning of the apparatus 1 of the present invention will now be described.

An article 4 is arranged resting on the upper surface 3 of the work plane 2 such that the flat surface 10 of the article 4 on which the designs and/or writings (11A, 11B, 11C) are reproduced is facing upwards; the article 4 can be arranged in any position on the upper surface 3 of the work plane 2 and in any orientation.

One or more small crosses CR can be made on the flat surface 10 of the article 4, i.e. pointed or geometric references traced on the flat surface 10 at the position of the design and/or writing and with respect to which the position and orientation of the design and/or the writing to which they are associated is known. Therefore the identification of the position of the crosses CR with respect to a reference system solidly constrained to the work plane 2 is equivalent to the identification of the orientation position to the plane 2 of the design and/or writing (11A, 11B, 11C) to which the crosses CR are associated.

The second vision camera 9 acquires an image of the whole upper surface 3 of the work plane 2 and identifies the position of the article 4 on the work plane 2 and the orientation thereof with respect to a reference system, solidly constrained to the work plane 2, which is used for moving the operating group 5, i.e. the second vision camera 9 identifies the position and orientation of each design and/or writing (11A, 11B, 11C) reproduced on the upper surface 3 of the article 4 with respect to the reference system used for moving the operating group 5.

The identification of the position and orientation of the designs and/or writing (11A, 11B, 11C) of the article 4 is done by means of recognition of the crosses CR on the image acquired by the second camera 9 or, should the crosses CR not be present on the acquired image, by means of the recognition of distinctive geometric characteristics (edges, etc.) of each design and/or writing.

Figure 2:
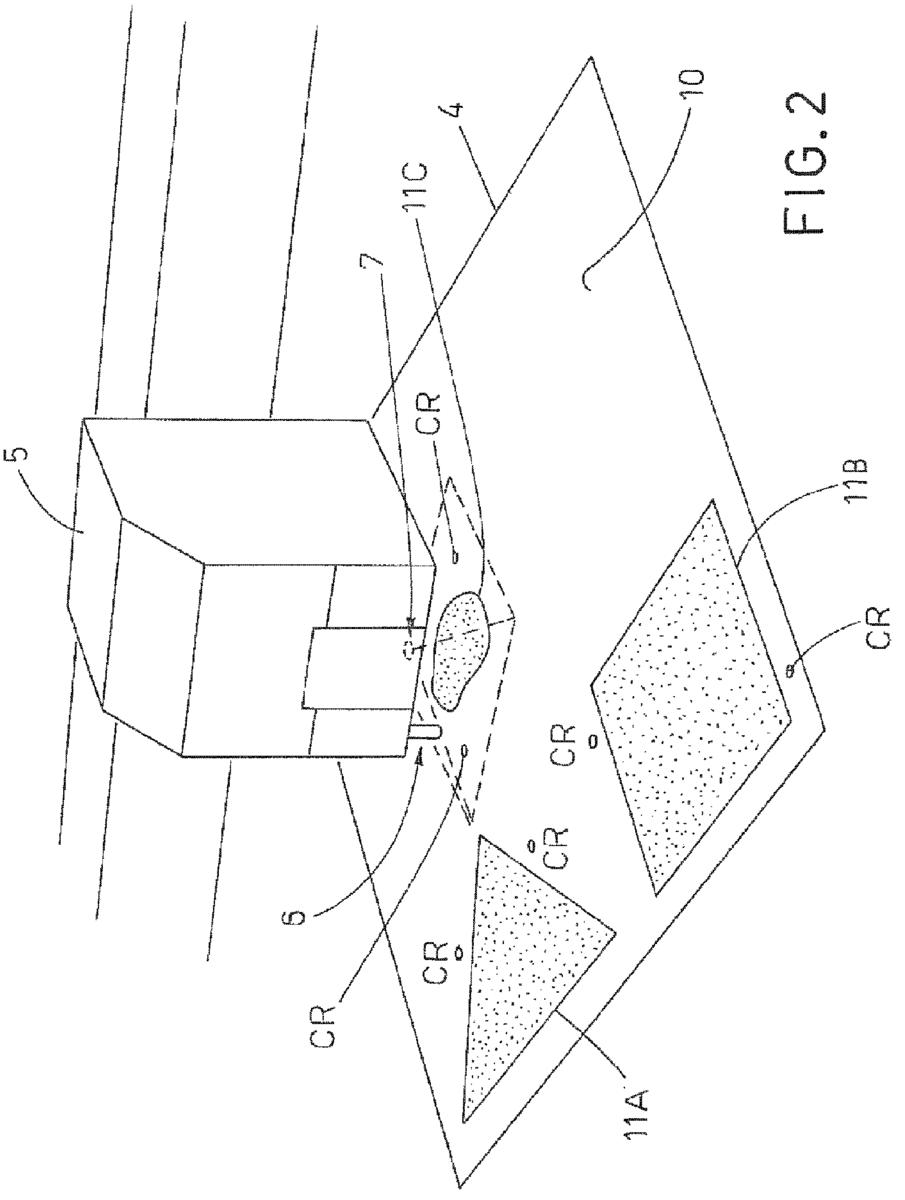
FIG. 2 is a perspective view in larger scale of a detail of the cutting and/or etching apparatus of the present invention.

The operating group 5 is then moved in the direction of the article 4, such that the first vision camera 7 can capture a portion of the flat surface 10 of the article 4 (FIG. 2), or the whole flat surface 10 should the article be of very limited dimensions and the flat surface 10 be entirely contained within the field of view of the first vision camera 7, and such that the position and orientation of each design and/or writing (11A, 11B, 11C) can be identified with respect to the reference system used for the movement of the operating group 5.

The first vision camera 7, being arranged at a lower height than the second vision camera 9, advantageously enables identification of the position and orientation of each design and/or writing (11A, 11B, 11C) with greater precision than the second optical means 9.

The operating group 5 is then moved, using the positional and orientational data, such that the cutting and/or etching means 6 operate the cut and/or etching of predetermined portions of the flat surface 10 of the article 4, in which the designs and/or writings (11A, 11B, 11C) are present.

In that apparatus of the present invention, a plurality of articles can be arranged resting on the work plane, with the relative flat surfaces thereof containing the designs and/or the writings facing upwards, however arranged and orientated; this advantageously enables an increase in the productivity of the apparatus with respect to the cutting and/or etching apparatus of known type.

The apparatus 5 further comprises selecting means 8 for selecting which portions of the flat surface 10 of the article, containing designs and/or writings, to cut and/or etch, and in which sequence to cut the selected portions.

The selecting means 8 can comprise a screen of the touch-screen type, or a screen and a keyboard. The whole flat surface 10 of the article 4 is projected onto the screen such that the user can simply and intuitively choose, from among a series of predetermined portions of the flat surface 10 containing designs and/or writings (11A, 11B, 11C), which portions to cut and/or etch.

Each design and/or writing, after having been detected and recognized by the second optical means 9, is associated to a file known as a cutting file, which is already present internally of a database and which contains information on the portion of the surface to be cut and/or etched such as to cut and/or etch the design and/or writing.

The apparatus for cutting and/or etching of known type perform the cut and/or the etching of all the predetermined portions of the flat surface containing the designs and/or the writings, which are present in the electronic control panel in the form of a single "cutting" file, with a cutting and/or etching sequence that is generated on the basis of a predetermined logic (for example a cutting and/or etching sequence such as to minimize the overall cutting and/or etching time of each article); thus it is not possible to select, from among the predetermined portions of the flat surfaces containing the designs and/or the writings, which to cut and/or etch, nor is it possible to establish the sequence in which the cut and/or etch them.

The selecting means 8 enable selection, from among a series of predetermined portion so the flat surface 10 containing designs and/or writings (11A, 11B, 11C) which portions to cut and/or etch and further enable establishing the sequence in which to cut and/or etch the portions of the flat surface 10 that have been selected.

In the absence of specific commands transmitted via the selecting means 8, the apparatus of the present invention performs the cut and/or etching of all the predetermined portions of the flat surface containing the designs and/or writings (11A, 11B, 11C) in a cutting and/or etching sequence generated on the basis of a predetermined logic, for example generated in such a way as to minimize the overall cutting and/or etching time of the article.

In a further embodiment, not illustrated in the figures, the second optical means of the apparatus comprise a plurality of vision cameras, arranged above the upper surface of the work plane at any height with respect thereto and with the optical axis thereof arranged angularly or perpendicularly with respect to the upper surface of the work plane.

Each camera can capture the whole upper surface of the work plane or a portion thereof; in the first case each camera can be used, including singly, for identifying the position and orientation of the article on the work plane, while in the second case, in order to identify the position and orientation of the article on the work plane, it is necessary to comprise at least a group of cameras which together capture the whole upper surface of the work plane and simultaneously process the images of the group of cameras such as to identify the position and orientation of each design and/or writing of the article.

In a variant, the second optical means comprise one or a plurality of color vision cameras; this advantageously enables recognition of the orientation and the position of each design and/or writing present on the flat surface of the article by means of the analysis of the shape and color of each design and/or writing.

The above description defines a method for actuating the apparatus, comprising the following steps:

- arranging at least an article 4 restingly on the upper surface 3 of the work plane 2, such that the flat surface 10 of the article 4 on which the designs and/or the writings 11A, 11B, 11C are reproduced is facing upwards;
- capturing, by means of the second optical means 9, the whole upper surface 3 of the work plane 2 and also an orientation as well as a position of the article 4 on the work plane 2.

The method advantageously enables, even when performed by an operator without any specific experience, a correct carrying-out of the cut and/or etching of the flat surface of the article by positioning the article and orientating it on the work plane in any way.

Further, the method can comprise steps of: moving the operating group 5 towards a zone of the upper surface 3 of the work plane 2 on which the article 4 is arranged; detecting, via the first optical means 7, some or all of the designs and/or the writings 11A, 11B, 11C reproduced on the article 4; performing the cutting and/or the etching of predetermined portions of the flat surface 10 of the article 4 containing the designs and/or the writings 11A, 11B, 11C.

Before the stage of performing the cut and/or etching of portions of the flat surface 10 of the article 4 containing the designs and/or writings 11A, 11B, 11C, the method can further comprise, the stage of selecting the portions of the flat surface 10 of the article 4 to be cut and/or etched.

The method can additionally comprise the stage of establishing the sequence with which to cut and/or etch the selected portions of the flat surface 10 of the article 4 containing the designs and/or writings 11A, 11B, 11C.

The stages of selecting the portions of the flat surface 10 of the article 4 to be cut and/or etched and establishing the sequence with which to cut and/or etch the selected portions enable the apparatus to be actuated in such a way as to afford it maximum operating flexibility.

The above has been described by way of non-limiting example, any constructional variants are considered to fall within the ambit of protection of the present technical; solution as described herein and claimed in the following claims.

The invention claimed is:

1. A method for cutting or etching articles having a flat surface on which designs or writing are reproduced comprising:

- providing an apparatus for cutting or etching the articles having the flat surface on which designs or writings are reproduced, the apparatus having an operating group arranged at a first height above a work plane, which work plane is provided with a flat upper surface for receiving a plurality of articles arranged in any position and in any orientation, the operating group being movable along and above the work plane according to a reference system constrained to the work plane in order to operate on the articles, the operating group being configured to cut or etch the articles and having first optics for detecting designs or writings reproduced on each article arranged on the work plane, the apparatus further having second optics arranged at a second height greater than the first height with respect to the work plane, the second optics being arranged at the second height above the operating group so that the second optics detect a whole flat upper surface of the work plane, detect the orientation and the position of the plurality of the articles on the work plane, and detect the orientation and position of the plurality of the articles with respect to the reference system used for moving the operating group, and the position of the operating group with respect the reference system;
- arranging a plurality of articles in any position and in any orientation restingly on the flat upper surface of the work plane, such that the flat surface of each article on which the designs or writings are reproduced is facing upwards;

detecting, via the second optics, the whole flat upper surface of the work plane and also the orientation and a position of each of the plurality of articles arranged on the work plane, and detecting, using the second optics, the position and the orientation of each of the plurality of the articles arranged on the work plane with respect to the reference system used for moving the operating group and the position of the operating group with respect the reference system; and, thereafter identifying by the second optics the position and orientation of each design or writing reproduced on the upper surface of one article of the plurality of articles with respect to the reference system;

moving the operating group with respect the reference system towards and above a zone of the upper surface of the work plane on which said one article is arranged so that the first optics are placed above the identified position and orientation of each design or writing reproduced on the upper surface of said article;

detecting, via the first optics, one or more of the designs or writings reproduced on said one article and then identifying the position and orientation of each design or writing to be cut or etched;

and, according to the identified position and orientation of each design or writing detected by the first optics, moving the operating group performs the cutting or etching of predetermined portions of the flat surface of said one article containing the designs or writings.

2. The method of claim 1, further comprising selecting the portions of the flat surface of said one article to cut or to etch upon.

3. The method of claim 2 further comprising establishing a sequence with which to cut or etch the selected portions of the flat surface of said one article containing the designs or writings.

* * * * *